United States Patent [19]

Takano et al.

[11] 3,867,302

[45] Feb. 18, 1975

[54] ORGANIC PHOSPHORS AND PROCESS FOR PRODUCTION THEREOF

[75] Inventors: Ryoshiro Takano, Kamakura; Sadayasu Miyahara, Fujisawa, both of Japan

[73] Assignee: Sinloihi Co., Osaka-shi, Japan

[22] Filed: Dec. 26, 1972

[21] Appl. No.: 318,036

[30] Foreign Application Priority Data
Dec. 24, 1971 Japan.................................. 46-3609

[52] U.S. Cl............. 252/301.2 R, 106/21, 106/193, 106/209, 106/217, 106/228, 106/241, 252/301.3 R
[51] Int. Cl.............................................. C09k 1/02
[58] Field of Search.............. 252/301.2 R, 301.3 R; 106/21

[56] References Cited
UNITED STATES PATENTS

| | | | |
|---|---|---|---|
| 2,086,745 | 7/1937 | Sell...................................... | 106/21 |
| 2,129,131 | 9/1938 | Hunter.......................... | 252/301.2 R |
| 2,177,701 | 10/1939 | Fonda.......................... | 252/301.2 R |
| 2,296,589 | 9/1942 | Yule.............................. | 252/301.2 R |
| 2,297,033 | 9/1942 | Stahr............................. | 252/301.2 R |
| 2,614,940 | 10/1952 | Freyermuth et al. ........ | 252/301.2 R |
| 2,631,243 | 3/1953 | Weber et al. ................ | 252/301.2 R |
| 2,673,153 | 3/1954 | Talbot.......................... | 252/301.2 R |
| 3,263,012 | 7/1966 | Nadler et al. ................ | 252/301.2 R |
| 3,326,744 | 6/1967 | Yungkurth...................... | 162/174 |
| 3,386,855 | 10/1945 | Horback ...................... | 252/301.2 R |
| 3,649,375 | 8/1953 | Davis .......................... | 252/301.2 R |

OTHER PUBLICATIONS

Mansour et al., J. Pharma. Sciences, 57(1968), p. 404-411.

*Primary Examiner*—Arthur P. Demers
*Attorney, Agent, or Firm*—Waters, Roditi, Schwartz & Nissen

[57] ABSTRACT

An organic phosphorescent material for printing or painting, and a process for its preparation, said organic phosphorescent material comprising a water-soluble organic phosphorescent activating substance uniformly dispersed in and combined with a water-soluble high molecular substance, said phosphorescent material being responsive to ultra-violet irradiation within a short period (of the order of milliseconds) and having good printability.

3 Claims, 2 Drawing Figures

3,867,302

ORGANIC PHOSPHORS AND PROCESS FOR PRODUCTION THEREOF

BACKGROUND OF THE INVENTION

This invention relates to an organic phosphorescent material, more particularly to an organic phosphorescent material in the liquid state which comprises a water-soluble phosphorescent activating substance uniformly dispersed in and combined with a water-soluble high molecular substance.

Organic phosphorescent materials per se are known in the art. For example, the British Pat. No. 870,504 discloses a process for preparing a phosphorescent pigment which comprises pulverizing or grinding a condensate formed by condensing a mixture of urea or melamine and an aqueous solution of formaldehyde in the presence of an organic activating substance which is not itself phosphorescent or is only weakly phosphorescent, or by heating molten urea to bring about its decomposition into cyanuric acid and other decomposition products, adding a suitable amount of said organic activating substance during the process of decomposition, and then adding para-formaldehyde powder. However, the phosphorescent condensation resin prepared by said process is so hard that it takes a long time to pulverize or grind it. For instance, even if a high-energy pulverizer, such as an air-jet pulverizer, is employed, it is very difficult to obtain a finely divided phosphorescent material suitable for the preparation of a printing ink.

The German Pat. No. 1,197,183 teaches a process for preparing a phosphorescent pigment which comprises reacting a biuret, triuret or tetrauret with a phosphorescent substance at a high temperature (220°C.) or reacting a cyanuric acid or a salt or ester thereof with a phosphorescent substance in the water under reflux. As compared with the above-mentioned process disclosed in the British Pat. No. 870,504, this process is advantageous in that it does not require a special operation for effecting pulverization, thereby greatly facilitating the process as a whole. However, the yield of the resulting pigment is as low as 65 to 67 percent, and since the resulting pigment particles are relatively large in size, such pigment can be used merely for the preparation of paints and pulverization or grinding is still required in order to obtain particles having a size suitable for the preparation of printing inks. Furthermore, it is extremely difficult to obtain a finely divided pigment, suitable for use in printing, by pulverization.

The British Pat. No. 1,002,002 discloses a process for preparing a finely divided phosphorescent pigment which comprises dissolving in a solvent a phosphorescent substance obtained by reacting urea at a high temperature (170° to 250°C.) with an activating substance such as an aromatic amine, a carboxylic acid, a sulfonic acid, an aminosulfonic acid, a phenol, etc., or by heating molten urea to form cyanuric acid, reacting it with said activating substance at a high temperature, adding it during the decomposition of urea, and then precipitating solids from the solution. The specification of said British patent also discloses a process for the preparation of a phosphorescent pigment which comprises reacting cyanuric acid, an ester or salt thereof with an activating substance such as mentioned above in a solvent under reflux. In these processes, however, the yield of the resulting pigment is as low as that in the process disclosed in the specification of German Pat. No. 1,197,183, and pulverization must be conducted in order to obtain a finely divided pigment which is of practical utility for the preparation of a printing ink. Moreover, even if an efficient pulverizer is employed, it is very difficult to pulverize the resulting pigment into particles having a suitable size for the printing ink use.

SUMMARY OF THE INVENTION

An object of this invention is to provide an improved organic phosphorescent material which is substantially free of the above-mentioned defects inherent in the conventional phosphorescent materials.

A further object of this invention is to provide a novel organic phosphorescent material in the liquid state comprising an organic phosphorescent activating substance dispersed uniformly in an aqueous solution of an organic film-forming polymer.

Another object of this invention is to provide a novel liquid organic phosphorescent material which can be excited by being exposed to the irradiation of ultraviolet rays for a time duration of the order of milliseconds to emit phosphorescence and which is also preferably used in the preparation of printing ink.

A still further object of this invention is to provide a novel process for preparing an organic phosphorescent material, by which a phosphorescent material having excellent properties such as described above can be prepared in a high yield without conducting a pulverizing or grinding step.

In accordance with this invention, there is provided a liquid phosphorescent material formed by incorporating a water-soluble, high molecular substance in an aqueous solution of a water-soluble organic phosphorescent activating substance and chemically combining both substances.

In accordance with another feature of this invention, there is provided a process for preparing an organic phosphorescent material in the liquid state, which comprises dissolving a water-soluble organic phosphorescent activating substance in water and dissolving a water-soluble, high molecular substance in the solution, thereby forming a substantially homogeneous phosphorescent material in the liquid state.

DETAILED DESCRIPTION OF THE INVENTION

Figure 1:
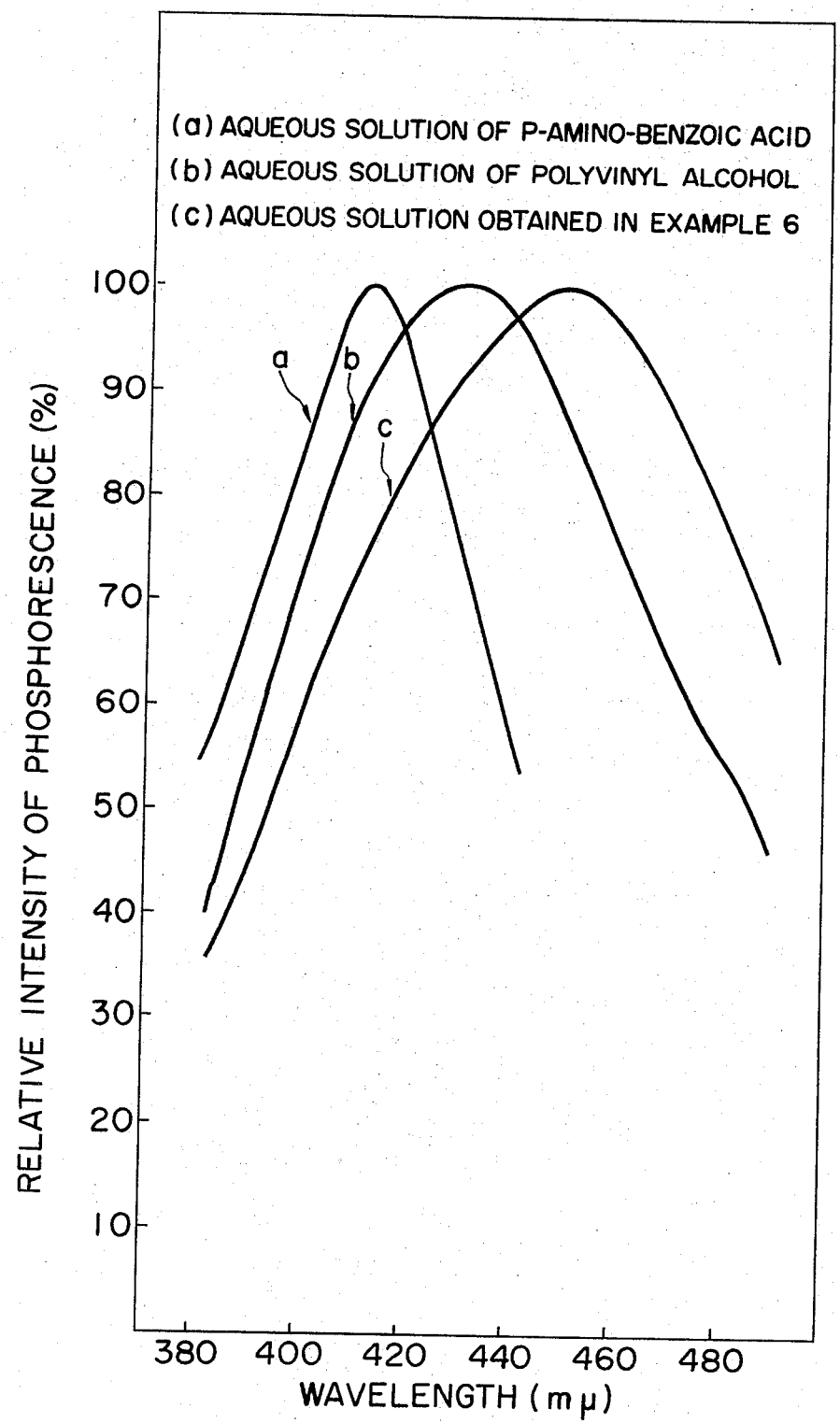
FIG. 1 is a view illustrating phosphorescent spectra of the organic phosphorescent substance of this invention and of elementary components thereof.

This invention relates to a novel phosphorescent material which can readily be excited under stimulation of ultraviolet rays to emit strong phosphorescence. This invention also relates to a process for producing such a phosphorescent material, which comprises the step of: dissolving one or more water-soluble organic phosphorescent activating substances in water, and then dissolving further one or more water-soluble, high molecular substances in the resulting solution.

Although the reason why the phosphorescent material, that is prepared by this invention, is such an excellent one has not completely been elucidated, it is nevertheless believed that the water-soluble, high molecular substance per se has hydrogen bonds exhibiting an important function in the phosphorescence-emitting phenomenon, and that when a suitable organic phosphorescent activating substance is incorporated into such water-soluble, high molecular substance, by their mutual action there is provided a phosphorescent material having a good film-forming property and being capable of emitting phosphorescence of a desired intensity throughout the wavelengths of the visible spectrum by having been exposed to the irradiation of ultraviolet rays.

The phosphorescent material of this invention is an aqueous composition which can be applied without any solvent. Therefore, the handling operation involved in its application is very easy, and no expensive and complicated apparatus or other means is necessary for the reaction of formation of the phosphorescent material or for the operation involving the actual application of the phosphorescent material. For instance, such a step as the recovery of solvent is dispensable in this invention.

The water-soluble, high molecular substance to be used as the film-forming substance in this invention includes, for example, gelatin, polyvinyl alcohol, gum arabic, tragacanth gum, sodium alginate, carboxymethyl cellulose, carboxyethyl cellulose and starch.

The water-soluble organic phosphorescent activating substance to be used in this invention includes, for example, para-amino-benzoic acid (bluish violet color), para-methyl-benzoic acid (blue color), para-methoxy-benzoic acid (blue color), para-hydroxy-benzoic acid (blue color), para-hydroxy-diphenyl (para-phenylphenol) (bluish green color), salicylic acid (bluish green color), 1-naphthol-4-sulfonic acid (Neville and Winther's acid) (yellow color), 2-naphthol-6,8-disulfonic acid (G acid) (yellow color), 2-naphthylamine-5,7-disulfonic acid (amino J acid) (yellow color), 2-naphthylamine-6,8-disulfonic acid (amino G acid) (yellow color), 1-naphthylamine-6-(7)-sulfonic acid (Cleve's acid) (yellow color), 2-naphthol-1-sulfonic acid (hydroxy-Tobias acid) (orange color), 2-naphthol-3,6,8-trisulfonic acid (orange color) and 1-naphthylamine-3,6,8-trisulfonic acid (orange color). These phosphorescent activating substances are selected suitably depending on the desired phosphorescent color and emission intensity of the resulting phosphorescent material. In the above recitation, the parenthesized color indicates the color of phosphorescence inherent in the phosphorescent activating substance.

The water-soluble organic phosphorescent activating substance is incorporated preferably in an amount of 0.5 to 5 percent by weight, most preferably about 3 percent by weight, based on the amount of the water-soluble, high molecular substance. When the water-soluble phosphorescent activating substance is incorporated in an amount less than the lower limit of the above range, the emission intensity is extremely reduced, and if the amount is greater than the upper limit of the above range, the emission intensity reaches the saturation point, thereby resulting in economical disadvantages.

The organic phosphorescent material of this invention can be prepared, for example, by the following procedures.

First of all at least one water-soluble organic phosphorescent activating substance is added under agitation to warm water. After it has been dissolved completely in the water, at least one water-soluble, high molecular substance is added to the solution. Then, the mixture is heated and agitated until the high molecular substance is completely dissolved. When the entire mixture becomes a homogeneous transparent solution, agitation under heating is stopped. Thus, a phosphorescent material is obtained.

In order to modify partially the characteristics of the resulting phosphorescent material, it is possible to incorporate a small amount of an additive in addition to the water-soluble organic phosphorescent activating substance and the water-soluble high molecular substance. For instance, an acrylic acid emulsion may be incorporated therein to improve the water resistance of the phosphorescent material. Furthermore, when a polyvinyl alcohol of a high degree of saponification is used as a component constituting the substrate of the phosphorescent material, the emission intensity and water resistance can be further improved. In this case, it is preferable to use polyvinyl alcohol having a degree of saponification higher than 88–89 mole %, especially about 98–99 mole %. However, the use of polyvinyl alcohol having too high a degree of saponification, e.g., 99.9 mole %, is not preferred because of operational difficulties or the like.

As described above, the phosphorescent material according to the present invention can be easily prepared without any pulverizing or grinding step. In addition to this advantage, this invention has various advantages and merits such as those mentioned below.

1. The resulting phosphorescent material can be excited within a very short period (of the order of milliseconds) to emit phosphorescence of a very high brightness.

2. Since the phosphorescent material is obtained in the form of an aqueous solution, it can be directly used preferably as an ink for typographical printing, photogravure printing, etc. merely upon adjustment of its viscosity or the like.

3. Since the phosphorescent material has no substantial substrate color, it can be used as an invisible ink for recording cryptographs on prints or the like or printing marks for automatic mail selection.

4. Since the phosphorescent material is obtained in the form of an aqueous solution, it can be utilized preferably as an ink for a felt pen, a stamp ink or a jet printer ink.

This invention will now be illustrated more detailedly by reference to the Examples, in which all of the "parts" mentioned are "parts by weight" unless otherwise indicated.

EXAMPLE 1

A vessel equipped with a stirrer and a thermometer was charged with 100 parts of warm water, and 0.6 part of para-amino-benzoic acid was added thereto under agitation, little by little. After para-amino-benzoic acid had been dissolved completely in the water, the solution was heated to 50° – 60°C, and 20 parts of gum arabic was added thereto little by little under violent agitation (2000 r.p.m.). The agitation was continued for 30 minutes while maintaining the temperature of the charge at 50° – 60°C. When the reaction mixture became a viscous, faintly yellow, transparent liquid, the agitation and heating were stopped and the reaction mixture was allowed to cool down.

A film of this obtained phosphorescent material emitted a bluish violet phosphorescence of a high intensity upon exposure to the irradiation of ultraviolet rays.

EXAMPLE 2

A vessel equipped with a stirrer and a thermometer was charged with 50 parts of warm water, and 0.6 part of para-methyl-benzoic acid was added thereto little by little under agitation. After it has been dissolved in the water, the resulting solution was heated to 50° – 60°C. Then, 10 parts of polyvinyl alcohol having a degree of saponification of 88–89 mole % was added little by little to the solution under violent agitation (2000 r.p.m.), following which 60 parts of warm water was added thereto. The thus obtained solution was heated to 80° – 85°C. Then, 10 parts of polyvinyl alcohol having a degree of saponification of 98–99 mole % was further added little by little under violent agitation. The agitation was continued for 1 hour while maintaining the temperature of the charge at 80° – 85°C. When the reaction mixture took the form of a viscous, faintly yellow, transparent liquid, the agitation and heating were stopped and the reaction mixture was allowed to cool down.

A film of this obtained phosphorescent material emitted a blue phosphorescence of a high intensity upon exposure to the irradiation of ultraviolet rays.

EXAMPLE 3

A vessel equipped with a stirrer and a thermometer was charged with 200 parts of warm water, and 1 part of para-methoxy-benzoic acid was added thereto under agitation little by little. After it had been dissolved completely in the water, the resulting solution was heated to 50° – 60°C. and 30 parts of sodium alginate was added thereto little by little under violent agitation (2,000 r.p.m.). The agitation was continued for 30 minutes while maintaining the temperature of the charge at 50° – 60°C. When the reaction mixture took the form of a viscous, faintly yellow, transparent liquid, the agitation and heating were stopped and the reaction mixture was allowed to cool down.

A film of thus obtained phosphorescent material emitted a blue phosphorescent of a high intensity upon exposure to the irradiation of ultraviolet rays.

EXAMPLE 4

A vessel equipped with a stirrer and a thermometer was charged with 120 parts of warm water, and 0.7 part of para-hydroxy-diphenyl (para-phenyl-phenol) was added little by little under agitation. After it had been dissolved completely in the water, 20 parts of tragacanth gum was added to the resulting solution little by little under violent agitation (2,000 r.p.m.). And the total charge was heated to 50° – 60°C., at which temperature the agitation was continued for 30 minutes. When the reaction mixture took the form of a viscous, faintly yellow, transparent liquid, the agitation and heating were stopped, and the reaction mixture was allowed to cool down.

A film of thus obtained phosphorescent material emitted a bluish green phosphorescence upon exposure to the irradiation of ultraviolet rays.

EXAMPLE 5

A vessel equipped with a stirrer and a thermometer was charged with 200 parts of warm water and 0.3 part of 2-naphthylamine-6,8-disulfonic acid (amino G acid) was added thereto little by little under agitation. After it has been dissolved completely in the water, 10 parts of carboxymethyl cellulose was added to the resulting solution little by little under violent agitation (2.000 r.p.m.). And the total charge was heated to 50° – 60°C., at which temperature the agitation was continued for 30 minutes. When the reaction mixture took the form of a viscous, faintly yellow, transparent liquid, the heating was stopped, and the reaction mixture was allowed to cool down under agitation.

Next, 10 parts of an acrylic acid ester emulsion (4 parts of solids) was added to the above viscous liquid under agitation, and the agitation was stopped when a homogeneous mixture was obtained.

A film of thus obtained phosphorescent material emitted a yellow phosphorescence of a high intensity upon exposure to the irradiation of ultraviolet rays.

EXAMPLE 6

A vessel equipped with a stirrer and a thermometer was charged with 160 parts of warm water, and 1.2 parts of para-amino-benzoic acid added thereto little by little under agitation. After it had been completely dissolved in the water, the resulting solution was heated to 50° – 60°C. And 40 parts of polyvinyl alcohol having a degree of saponification of 88 – 89 mole % was added thereto little by little under violent agitation (2,000 r.p.m.). The agitation was continued for 30 minutes while maintaining the temperature of the charge at 50° – 60°C. When the reaction mixture took the form of a viscous, faintly yellow, transparent liquid, the heating was stopped and the reaction mixture was allowed to cool down under agitation.

A film of thus obtained phosphorescent material emitted a bluish violet phosphorescence of a high intensity upon exposure to the irradiation of ultraviolet rays.

Phosphorescent spectra of the reactants used in the process of Example 6 and the phosphorescent material obtained in Example 6 were measured to obtain the results shown in FIG. 1.

In FIG. 1, the curve (a) shows the phosphorescent spectrum of an aqueous solution containing 3 percent by weight of para-amino-benzoic acid, the curve (b) shows the phosphorescent spectrum of an aqueous solution containing 20 percent by weight of polyvinyl alcohol having a degree of saponification of 88 – 89 mole %, and the curve (c) shows the phosphorescent spectrum of the aqueous solution prepared by the method of Example 6.

The measurement of the phosphorescent spectrum was conducted in the following manner:

1. The intensity of phosphorescence at each wavelength was measured at 80 milliseconds after stoppage of excitation and expressed in terms of a relative value calculated on the supposition that the intensity at the peak is 100.

2. Stimulant rays were radiated by means of a fluorescence inspecting lamp of model F1-3(S) (main wavelength = 2537A), manufactured by Tokyo Shibaura Denki K.K.

3. Used as a spectrophotometer was a Model QR-50 photoelectric spectrophotometer (Littrow type), manufactured by Kabushiki Kaisha Shimazu Seisaku Sho.

From the degree of shifting in the phosphorescent spectrum curves of FIG. 1, it is apparent that the reaction is caused to occur between the water-soluble, high molecular substrate and the organic phosphorescent activating agent to form hydrogen bonds.

Figure 2:
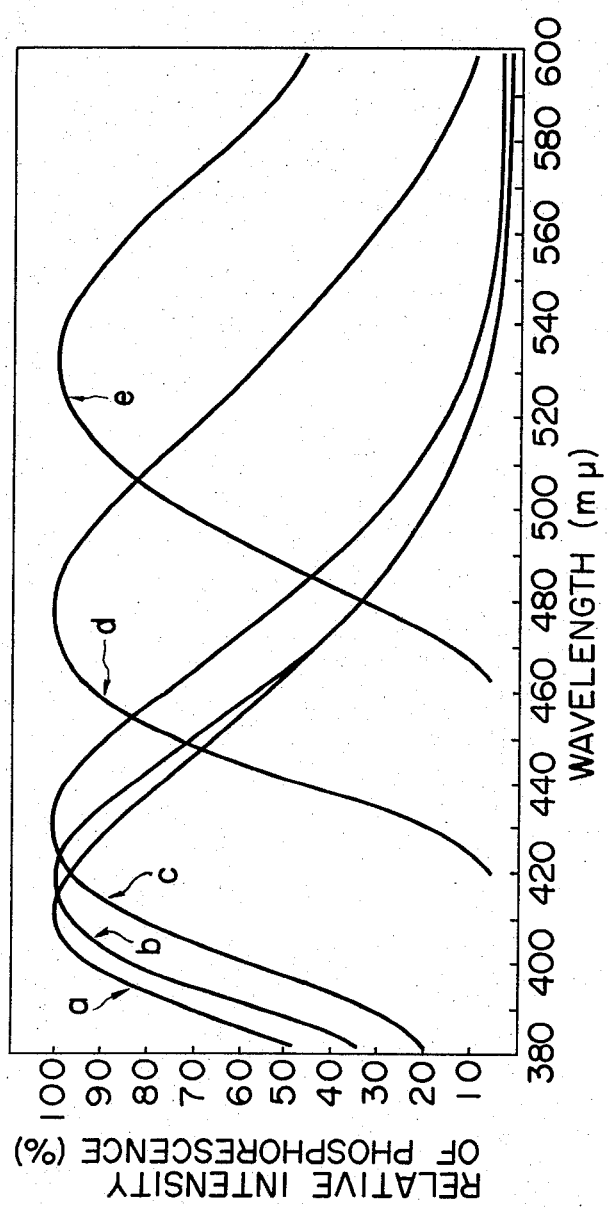
FIG. 2 is a view illustrating phosphorescent spectra of various phosphorescent materials of this invention.

FIG. 2 is given to compare phosphorescent spectra of phosphorescent materials obtained in the Examples of this invention, in which the curve (a) illustrates the phosphorescent spectrum of the material of Example 2, the curve (b) illustrates that of the material of Example 3, the curve (c) is that of the materials of Examples 1 and 6, the curve (d) illustrates that of the material of Example 4 and the curve (e) illustrates the phosphorescent spectrum of the material of Example 5.

The phosphorescent spectra shown in FIG. 2 were determined in the following manner:

1. The intensity of phosphorescence at each wavelength was measured at 80 milliseconds after stoppage of excitation and expressed in terms of a relative value calculated on the supposition that the intensity at the peak is 100.
2. The measurement was effected on samples obtained by conducting the photogravure printing with use of products of each Example.
3. Stimulant rays were radiated by means of a Model F1-3(S) fluorescence inspecting lamp (main wavelength = 2,537 A), manufactured by Tokyo Shibaura Denki K.K.
4. Used as a spectrophotometer was a Model QR-50 photoelectric spectrophotometer (Littrow type), manufactured by Kabushiki Kaisha Shimazu Seisaku Sho.

What is claimed is:

1. An aqueous organic phosphorescent printing ink for giving a phosphorescent print capable of emitting phosphorescence upon exposure to ultra-violet radiation, comprising an aqueous solution of at least one water-soluble, polymer substance selected from the group consisting of gelatin, polyvinyl alcohol, gum arabic, tragacanth gum, sodium alginate, carboxymethyl cellulose, carboxyethyl cellulose, and starch and at least one water-soluble, organic phosphorescent activating substance selected from the group consisting of para-aminobenzoic acid, para-methyl-benzoic acid, para-methoxy-benzoic acid, para-hydroxy-benzoic acid, para-hydroxy-diphenyl, salicylic acid, 1-naphthol-4-sulfonic acid, 2-napththol-6,8-disulfonic acid, 2-napthylamine-5,7-disulfonic acid, 2-naphthylamine-6,8-disulfonic acid, 1-naphthylamine-6-(7)-sulfonic acid, 2-naphthol-1-sulfonic acid, 2-naphthol-3,6,8-trisulfonic acid, and 1-naphthylamine-3,6,8-trisulfonic acid wherein said phosphorescent activating substance is present in an amount of 0.5 to 5 percent by weight of said water-soluble polymer substance, said water-soluble, organic phosphorescent activating substance being uniformly distributed in and combined with said polymer in said solution so as to emit intense phosphorescence by ultral-violet radiation after printing.

2. An aqueous organic phosphorescent printing ink according to claim 1 wherein said water-soluble polymer substance is present in said aqueous solution in a concentration of 5 to 25 parts per 100 parts of water.

3. An aqueous organic phosphorescent printing ink according to claim 1 wherein said activating substance is present in said aqueous solution in a concentration of 0.15 to 0.75 parts per 100 parts of water.

* * * * *